Dec. 26, 1950     J. SAKIRSKY     2,535,988
TENSION TESTING APPARATUS FOR ELECTRIC
SOCKETS AND WIRE CONNECTIONS
Filed Oct. 18, 1949            2 Sheets-Sheet 2

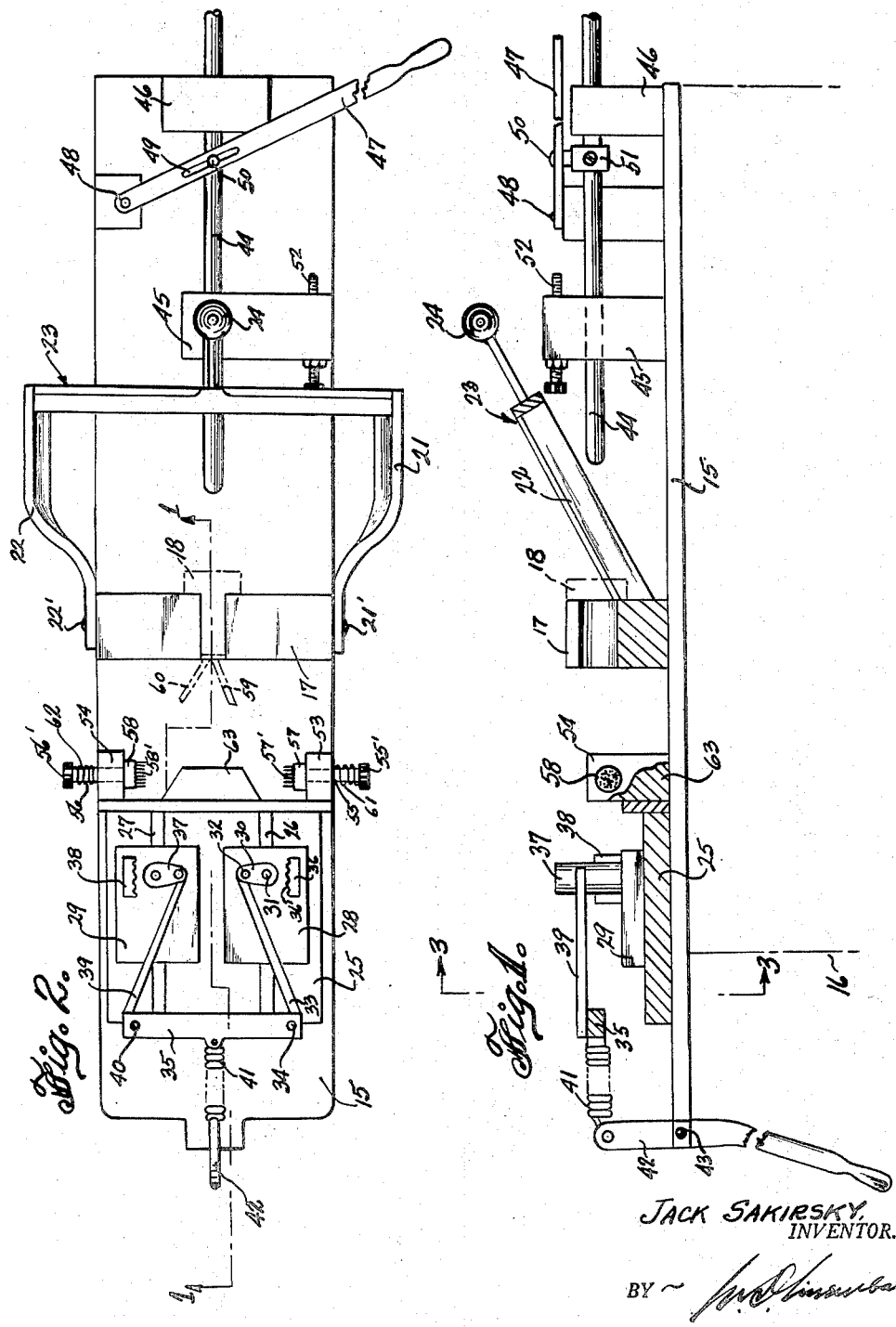

JACK SAKIRSKY
INVENTOR.

BY
ATTORNEY

Patented Dec. 26, 1950

2,535,988

UNITED STATES PATENT OFFICE 2,535,988

TENSION TESTING APPARATUS FOR ELECTRIC SOCKETS AND WIRE CONNECTIONS

Jack Sakirsky, Bridgeport, Conn., assignor to Jacob B. Lew, Brooklyn, N. Y.

Application October 18, 1949, Serial No. 122,076

3 Claims. (Cl. 73—95)

1

The present invention relates to a testing device for use by manufacturers of electrical Christmas tree lighting outfits. Such outfits comprise a plurality of spaced sockets each holding an electric bulb and usually connected in electrical series by insulated wires which terminate in a plug for connection to a source of electrical supply.

The principal object of this invention is to provide a novel and improved device for determining whether the wire leads to each socket are properly physically attached to the socket components, whether the sockets and the wire leads connected thereto are correct for proper electrical operation and to test the bulbs.

Another object hereof is to provide a device of the character set forth, which also accomplishes a socket assembly operation.

A further object hereof is to provide a novel and improved device of the type set forth, which is reasonably cheap to manufacture, easy to use and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a front view of a device embodying the teachings of this invention.

Fig. 2 is a top view thereof.

Figure 3:
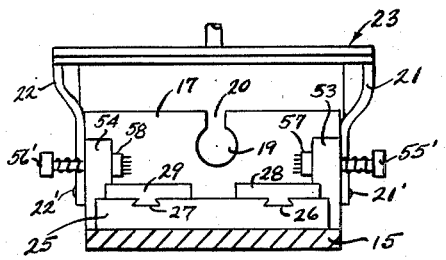
Fig. 3 is a fragmentary section taken at lines 3—3 in Fig. 1.

It may be noted that Fig. 1 is partly in section as taken at lines 1—1 in Fig. 2.

In the drawings, the numeral 15 denotes an elongated flat base, adapted to be mounted on a table 16. This base carries a block 17 which is a holder for the socket 18 to be dealt with. The socket fits into hole 19 which is horizontal

2 through block 17, along the length of the base 15. Block 17 has an opening 20, downwardly from its top edge, of a width less than the diameter of hole 19 and communicating with said hole, whereby said hole and opening together form a key-hole-shaped hole. Block 17 is about at the middle section of the base 15. The arms 21 and 22 of a bail 23, straddle block 17 and are pivotally secured to said block at 21' and 22' respectively, so that the bail can be swung by means of its handle 24, towards either end of the base 15.

Near one end of the base, is a fixed block 25, which has a pair of spaced grooves 26 and 27, which run longitudinally of the base 15. These grooves may be dove-tail-shaped and serve as tracks for the slides 28 and 29, respectively. Each of these slides carry a wire-gripping means. Such means on slide 28, comprises a cam 30 pivoted on slide 28 at 31. This cam is pivotally linked at 32 to one end of a link 33, whose other end is linked pivotally at 34 to an end of the cross-bar 35. The numeral 36 indicates a fixed block having a serrated face 36' opposite the cam 30. The similar gripping means on slide member 29, comprises a cam 37, serrated-face block 38 and link member 39, the latter being pivoted at 40 to the other end of the cross bar 35. In the assembly shown in Fig. 1, the cams are between their associated serrated-faced blocks. A tension coil spring 41, is connected at one of its ends to the mid-point of the cross piece 35, and its other end to an operating lever 42 which is pivotally mounted at 43 on the base 15.

At the other end of the base 15, is a metal rod 44 in axial alignment with the hole 19. Said rod is slidably mounted through the spaced posts 45 and 46 which extend from the base. A lever 47, pivoted at 48, is adapted upon movement thereof, to shift the rod 44 into and out of the socket 18. Said lever has a slot 49, through which extends a headed pin 50, secured in block 51 carried by the rod 44. Extent of rod movement into the socket, is controlled by an adjustable stop bolt 52, mounted in post 45.

Between plate 25 and the socket holder 17, there are the two insulated posts 53 and 54, one at each side of the base 15, and opposite each other. Through each of these posts is a pin slidable crosswise of the base 15. These pins are indicated by the numerals 55 and 56 respectively. At their outer ends, these pins have insulated heads 55' and 56' respectively. At their inner ends, said pins have the heads 57 and 58 respectively. These latter heads have the oppositely extending pin points 57' and 58', which are adapted to pierce through the insulation on the wires 59 and 60 connected to the socket 18, and to make electrical contact with the wires respectively. The numerals 61 and 62 denote compression coil springs about the respective pins 55 and 56, to hold the wire-piercing heads 57 and 58 normally away from the rubber post 63 between the posts 53 and 54.

It may here be noted that the bail arms 21 and 22 are so bent and shaped that they act as cams to push the pins 55 and 56 towards the rubber post 63, upon contacting the heads 55' and 56' when the bail 23 is swung downward to the left of socket holder 17 in Fig. 1.

Figure 7:
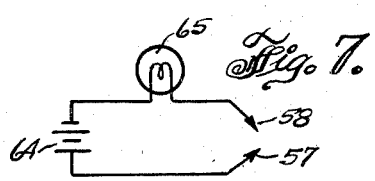
Fig. 7 is a diagrammatic showing the electrical test circuit employed in the device illustrated in Fig. 1.

Referring to Fig. 7, piercing head 57 is electrically connected to one terminal of a source of electrical energy 64, whose other terminal is connected to a lamp 65, and piercing head 58 is connected to the other lamp terminal.

Figure 5:
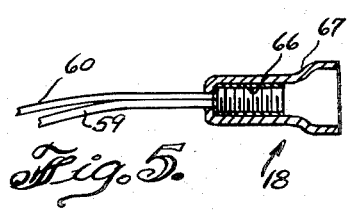
Fig. 5 is a central longitudinal section of an assembled socket.

One type of socket used in Christmas tree lighting outfits, comprises a metal screw shell 66, whose bottom is closed by an insulative washer carrying a central metallic element; said metal parts constituting the terminals of the socket 18 to which the wires 59 and 60 are respectively connected by soldering or otherwise, after said wires are threaded through the insulative tubular socket casing member 67, to extend out of the flared or enlarged end of said casing member 67, all of which is well known in the art. One of the necessary operations thereafter is to set the screw shell 66 into the casing 67 as shown in Fig. 5. The rim of the screw shell, usually is slightly flared and burred, so that the screw shell is force fitted into the tubular casing 67. It will be shown that with the device herein described, such assembly of the screw shell 66 into the casing member 67, is accomplished.

All the sockets of a lighting outfit mentioned, being prepared as set forth in the preceeding paragraph, each such socket is separately dealt with to be assembled and tested with the device illustrated in Fig. 1, or a plurality of sockets may be simultaneously dealt with by use of the apparatus shown in Fig. 4, which latter will be later herein explained.

The use of the device of Fig. 1 will now be considered. Commencing with the set-up shown in Fig. 1, the wires 59 and 60 are placed in hole 19 through opening 20. The socket casing member 67 is placed in hole 19, with flared end towards rod 44, and screw shell 66 is placed into casing 67 as far as the finger of the operator can push it in. Now lever 47 is moved to shift the rod 44 into the screw shell 66. This rod contacts the bottom and tubular wall of the screw shell and forces said screw shell into the socket casing 67 to proper position determined by stop 52.

Wire 60 is now placed between the rubber post 63 and the piercing head 58, and also between the cam 37 and the block 38. Likewise, the wire 59 is placed between the rubber post 63 and the piercing head 57, and also between cam 30 and the block 36. The handle of lever 42 is now moved to the right in Fig. 1, which causes said wires to be gripped by the said cams respectively, and the slides 28 and 29 will move towards the left. Said wires will thus be stretched taut and pulled on and the effectiveness of their mechanical connection to the socket parts will thus be tested. If any of such connections are improper in strength or loose, the wire will break off the socket part. The application of the pulling force, being at the middle of the cross bar 35, the forces pulling on the wires will be alike. The elastic connection offered by the spring 41, will limit the forces applied to pull the wires, and the spring strength shall be such that the maximum force applied to pull the wires, shall be for the strength of joint connection to socket parts, as may be required for instance by underwriters specifications.

If the socket 18 is found properly connected to said wires as to mechanical strength in the respect mentioned, it is now to be tested to determine if it is electrically correct. For this, the bail 23 is swung to the left and downward until the cam-functioning bail arms 21 and 22, push the pins 55 and 56 towards each other, whereupon metallic points 58' will pierce the insulation and contact the bare wire of 60, and the points 57' will pierce the insulation and contact the bare wire of 59. With rod 44 within the socket 18 and in contact with the terminals of said socket, the circuit of lamp 65 will be closed, and said lamp will be lit. Now lever 47 is moved to shift the rod 44 out of the socket 18. If there is a short circuit in the socket 18 the lamp 65 will remain lit, and hence said socket is defective. If the lamp becomes unlit, the socket tested, is proper electrically.

Now the bulb (not shown) which is to be in said socket 18, is mounted therein. If such bulb is good, it and bulb 65 will light up, but if defective, then the circuit of Fig. 7, will remain open. Upon furnishing said socket with a bulb found good, the bail 23 is lifted, whereupon springs 61 and 62, which were stressed, will cause the return of the piercing heads 57 and 58 to normal rest position as in Fig. 1. The tested socket is now removed from the device, and another socket of the outfit, is taken for test.

Figure 6:
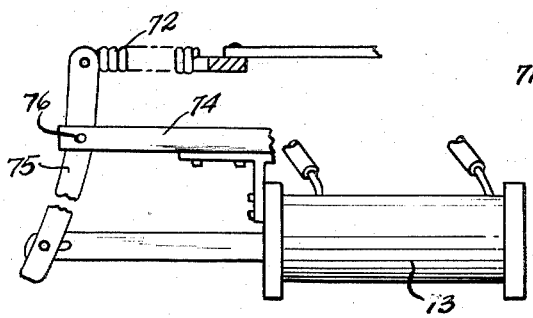
Fig. 6 shows a modified driving means to operate a component of said devices.

Utilizing the above teachings, a plurality of sockets may be simultaneously tested. For this purpose I show the device illustrated in Fig. 4, which is adapted to test four sockets at once, as an example. Here, bar 68 is adapted to hold four sockets 70. The numerals 69 denote two-wire gripping means, one such means for each socket. To attain equal pulling forces to be applied to all wires tested, a multi-cross bar and tension spring arrangement as indicated generally by the numeral 71 may be employed, or else to each spring 72, the mechanism shown in Fig. 6 may be used, where 73 is a double-acting pneumatically-operated cylinder, mounted under the base 74, and linked by lever 75 pivotally carried on said base at 76. When such pneumatic means are used, all components shown in Fig. 4 below the springs 72 on the drawing sheet, are omitted, including the operating lever 77 for the means 71.

Figure 4:
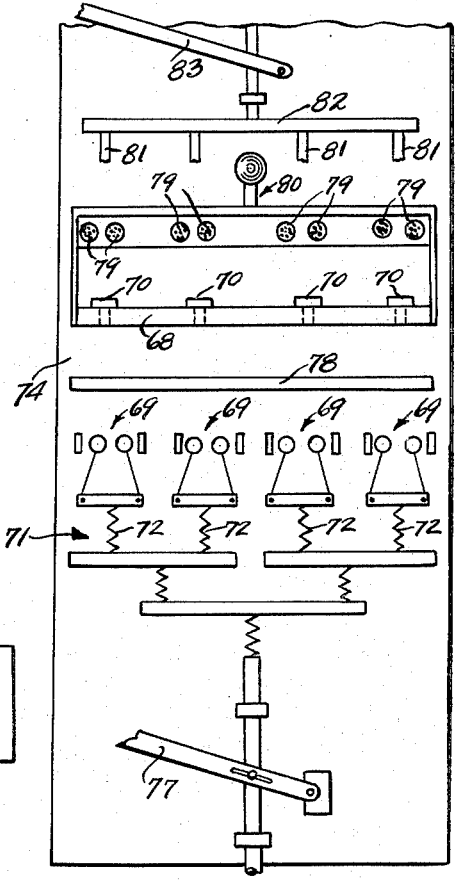
Fig. 4 is a fragmentary, partly diagrammatic top plan view of a modified form of said device. Here, a plurality of sockets are dealt with simultaneously, while with the device of Fig. 1, only one socket is tested and assembled.

In Fig. 4, the numeral 78 denotes a rubber bar, where the piercing heads 79 engage the wires leading from the sockets 70, respectively. Said piercing heads are carried on a bail 80. The pins 81 carried on bar 82 moved by lever 83, are akin in function to the rod 44.

Figure 8:
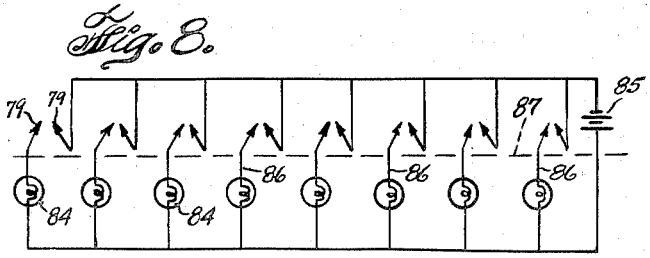
Fig. 8 is a diagrammatic showing of the electrical test circuit used with the device shown in Fig. 4.

The electrical test circuit involving the device of Fig. 4, is included in Fig. 8, which really shows the test circuit when the device is adapted to receive eight sockets for testing, instead of only four as required specifically by the embodiment illustrated in Fig. 4. This is so shown, because it is usual that Christmas tree lighting outfits of this type have eight sockets. Regardless however of the number of sockets to be electrically tested, the scheme of wiring is the same. Each pair of associated piercing heads 79, are in branch with a lamp 84, all branches being in parallel electrical connection across a source of energy 85. In view of the explanation given as to the operation of the circuit shown in Fig. 7, the operation of the circuit of Fig. 8, needs no further detail and is evident to those versed in the art. However, for the testing of bulbs mounted in the sockets 70, which bulbs are to be part of the lighting outfit, it is advisable that the connecting conductors 86 be bare and that a metal rod 87 be laid across them in order to shunt out the lamps 84, so as to limit the necessary current source 85.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description herein to indicate the scope of this invention.

I claim:

1. In a testing device of the character described, a base, a holder for an electrical lamp socket structure having two extending lead wires which have insulation covering and which are electrically connected to the terminals of the socket respectively; said holder being mounted on the base, two members independently movably mounted on the base, each adapted for movement towards and away from said holder, separate wire-gripping means carried on each of said members; each wire-gripping means including a pair of spaced elements, at least one of each pair being a rotatably mounted cam adapted to be turned to approach its associated element, whereupon said wires when placed respectively between each pair of elements, will be gripped respectively upon such rotation of the cams, means connected to the movable members on the base, adapted to be shifted in one direction whereupon said members are independently shifted away from the holder, and means connected to said cams of the wire-gripping means, adapted to be shifted in one direction whereupon the cams are turned so that the space between each pair of said wire-gripping elements will be decreased until the wires are gripped respectively and both said means being further adapted to be shifted in reverse direction whereupon the space between the elements of said pairs respectively will increase and the movable members will be shifted to cease the pull on said wires.

2. The testing device as defined in claim 1, wherein the means for operating the cams includes a pair of links, a cross bar; one end of each link being pivotally mounted on a separate axis on said bar, the other ends of said links being respectively pivotally connected to the respective rotatable cams on axes spaced from and parallel to the respective axes of rotation of said cams and means connected to the bar, adapted for pulling the bar laterally between the pivotal connections of the links on said bar, whereby both cams will turn.

3. In a testing device of the character described, a base, a holder for an electrical lamp socket structure having two extending lead wires electrically connected to the terminals of the socket respectively; said holder being mounted on the base, two members independently movably mounted on the base, means to shift said movable members, each of said members being adapted for movement towards and away from said holder, separate wire gripping means carried on each of said members, adapted each to receive one of said lead wires respectively and means to operate said gripping means before completion of movement of said members away from the holder, whereby said wires are securely held by said respective gripping means, during movement of said members away from the holder.

JACK SAKIRSKY.

REFERENCES CITED

The following references are of record in the file of this patent:

UNITED STATES PATENTS

| Number | Name | Date |
| --- | --- | --- |
| 564,012 | Fraser | July 14, 1896 |
| 1,527,409 | Hassel | Feb. 24, 1925 |
| 1,599,254 | Smith, Jr. | Sept. 7, 1926 |
| 1,723,816 | Scott | Aug. 6, 1929 |
| 2,033,624 | Freeland | Mar. 10, 1936 |
| 2,136,344 | Kochheiser et al. | Nov. 8, 1938 |
| 2,167,209 | Huskey | July 25, 1939 |
| 2,321,875 | Temple | June 15, 1943 |
| 2,393,177 | Longfellow | Jan. 15, 1946 |
| 2,453,576 | Jacob | Nov. 9, 1948 |